(12) United States Patent
Zhong et al.

(10) Patent No.: US 11,467,450 B2
(45) Date of Patent: Oct. 11, 2022

(54) OPTICAL ASSEMBLY, LIQUID CRYSTAL DISPLAY PANEL, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Xuan Zhong, Beijing (CN); Hongliang Yuan, Beijing (CN); Jiantao Liu, Beijing (CN); Jian Wang, Beijing (CN); Donghua Zhang, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/290,484

(22) PCT Filed: Aug. 26, 2020

(86) PCT No.: PCT/CN2020/111398
§ 371 (c)(1),
(2) Date: Apr. 30, 2021

(87) PCT Pub. No.: WO2021/057368
PCT Pub. Date: Apr. 1, 2021

(65) Prior Publication Data
US 2021/0405458 A1 Dec. 30, 2021

(30) Foreign Application Priority Data
Sep. 26, 2019 (CN) .......................... 201921617621.9

(51) Int. Cl.
*G02F 1/13363* (2006.01)
*G02F 1/1335* (2006.01)
*G02F 1/1343* (2006.01)

(52) U.S. Cl.
CPC .... *G02F 1/133638* (2021.01); *G02F 1/13439* (2013.01); *G02F 1/133528* (2013.01);
(Continued)

(58) Field of Classification Search
None
See application file for complete search history.

(56) References Cited

U.S. PATENT DOCUMENTS

2005/0134773 A1\* 6/2005 Park .................. G02F 1/133555
349/114
2006/0256268 A1\* 11/2006 Jeong ................ G02F 1/134363
349/114
(Continued)

FOREIGN PATENT DOCUMENTS

CN 1629697 A 6/2005
CN 1862328 A 11/2006
(Continued)

*Primary Examiner* — Ryan Crockett
(74) *Attorney, Agent, or Firm* — ArentFox Schiff LLP; Michael Fainberg

(57) ABSTRACT

An optical assembly, a liquid crystal display panel, and a display apparatus, the optical assembly including: a quarter-wave plate, a half-wave plate, and a linear polariser stacked in sequence; the direction of the absorption axis of the linear polariser, the direction of the slow axis of the half-wave plate and the quarter-wave plate are all parallel to the linear polariser; a first included angle between the direction of the absorption axis of the linear polariser and a first direction is 90°-100°; a second included angle between the direction of the slow axis of the half-wave plate and the first direction is 107°-114°; a third included angle between the direction of
(Continued)

the slow axis of the quarter-wave plate and the first direction is 164°-176°.

11 Claims, 16 Drawing Sheets

(52) U.S. Cl.
CPC ...... *G02F 2203/02* (2013.01); *G02F 2413/02* (2013.01); *G02F 2413/06* (2013.01)

(56) References Cited

U.S. PATENT DOCUMENTS

| | | | | |
|---|---|---|---|---|
| 2017/0269373 | A1* | 9/2017 | Kasahara | ............. H04N 13/302 |
| 2018/0370184 | A1* | 12/2018 | Ito | ............................ H01L 51/50 |
| 2019/0079342 | A1* | 3/2019 | Fuchida | ............. G02F 1/133504 |
| 2020/0219906 | A1* | 7/2020 | Zheng | ............... G02F 1/133345 |
| 2020/0236329 | A1 | 7/2020 | Takanashi | |
| 2021/0405458 | A1* | 12/2021 | Zhong | ............... G02F 1/133528 |

FOREIGN PATENT DOCUMENTS

| | | |
|---|---|---|
| CN | 104345488 A | 2/2015 |
| CN | 108431651 A | 8/2018 |
| CN | 109507770 A | 3/2019 |
| CN | 109524422 A | 3/2019 |
| CN | 110050209 A | 7/2019 |
| CN | 210573094 U | 5/2020 |
| JP | 2018132671 A | 8/2018 |

* cited by examiner

OPTICAL ASSEMBLY, LIQUID CRYSTAL DISPLAY PANEL, AND DISPLAY APPARATUS

CROSS-REFERENCE TO RELATED APPLICATIONS

This application is a National Stage of International Application No. PCT/CN2020/111398, filed Aug. 26, 2020, which claims priority to Chinese Patent Application No. 201921617621.9, filed Sep. 26, 2019, both of which are hereby incorporated by reference in their entireties.

FIELD

The disclosure relates to the field of display technologies, and in particular, to an optical assembly, a liquid crystal display panel, and a display apparatus.

BACKGROUND

Due to advantages such as low power consumption and low cost, reflective liquid crystal display panels (LCDs) have a great market potential in the fields of electronic books, electronic tags and the like. An electronically controlled birefringence LCD panel (ECB-LCD) is formed by arranging nematic liquid crystals with dielectric anisotropy parallel to the surface of a liquid crystal cell. The included angle between a long axis of a liquid crystal molecule and an electric field changes with the voltage when the ECB-LCD is powered on, so the birefringence of the liquid crystal cell changes, and the conversion between linearly polarized light and circularly polarized light of incident light can be achieved. In addition, compared with a twisted nematic (TN) display mode, the ECB display mode has a better dark state and a better viewing angle. Therefore, reflective ECB-LCDs have a wide range of applications at present.

SUMMARY

Some embodiments of the disclosure provide an optical assembly, including: a quarter-wave plate, a half-wave plate, and a linear polarizer stacked successively, wherein an absorption axis direction of the linear polarizer, a slow axis direction of the half-wave plate, and a slow axis direction of the quarter-wave plate are all parallel to the linear polarizer;

a first included angle between the absorption axis direction of the linear polarizer and a first direction is 90° to 100°, and is obtained by rotating from the first direction to the absorption axis direction of the linear polarizer counterclockwise in a plane parallel to the linear polarizer;

a second included angle between the slow axis direction of the half-wave plate and the first direction is 107° to 114°, and is obtained by rotating from the first direction to the slow axis direction of the half-wave plate counterclockwise in a plane parallel to the linear polarizer; and a third included angle between the slow axis direction of the quarter-wave plate and the first direction is 164° to 176°, and is obtained by rotating from the first direction to the slow axis direction of the quarter-wave plate counterclockwise in a plane parallel to the linear polarizer.

In some embodiments, the first included angle between the absorption axis direction of the linear polarizer and the first direction is 95°;

the second included angle between the slow axis direction of the half-wave plate and the first direction is 110°; and the third included angle between the slow axis direction of the quarter-wave plate and the first direction is 170°.

In some embodiments, the retardation of the half-wave plate under the wavelength of 550 nm is 259 nm to 284 nm; and/or the retardation of the quarter-wave plate under the wavelength of 550 nm is 100 nm to 110 nm.

In some embodiments, the retardation of the half-wave plate under the wavelength of 550 nm is 267 nm; and/or the retardation of the quarter-wave plate under the wavelength of 550 nm is 110 nm.

Some embodiments of the disclosure provide a liquid crystal display panel, including:

the optical assembly provided in any one of foregoing embodiments, and a liquid crystal cell located on a side of the quarter-wave plate away from the half-wave plate.

In some embodiments, the liquid crystal cell includes a liquid crystal layer containing nematic liquid crystal molecules, wherein an included angle between the initial orientation of the nematic liquid crystal molecules and the slow axis direction of the quarter-wave plate is 0° to 3°.

In some embodiments, the retardation of the liquid crystal layer under the wavelength of 550 nm is 143 nm to 190 nm.

In some embodiments, the retardation of the liquid crystal layer under the wavelength of 550 nm is 170 nm.

In some embodiments, the liquid crystal cell includes:

an array substrate, and a liquid crystal layer, wherein the array substrate is located on a side of the liquid crystal layer away from the optical assembly; and the array substrate includes a base substrate and a plurality of reflective pixel electrodes on the base substrate, the plurality of reflective pixel electrodes being located between the base substrate and the liquid crystal layer.

In some embodiments, the array substrate further includes:

a resin layer of a concave-convex structure located between the base substrate and the plurality of reflective pixel electrodes, wherein the plurality of reflective pixel electrodes structurally conform to the resin layer of the concave-convex structure.

In some embodiments, the slope of the concave-convex structure is 5° to 15°.

In some embodiments, the liquid crystal display panel is a reflective electronically-controlled birefringence liquid crystal display panel.

Some embodiments of the disclosure provide a display apparatus, including the liquid crystal display panel provided in foregoing embodiments.

DETAILED DESCRIPTION OF THE EMBODIMENTS

To make the objectives, technical solutions, and advantages of embodiments of the disclosure clearer, the technical solutions in the embodiments of the disclosure are described below clearly and completely with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the disclosure.

Unless otherwise defined, the technical terms or scientific terms used herein should have general meanings understood by people of ordinary skill in the art of the disclosure. The words "firs", "second" and the like used in the specification and claims of the disclosure do not indicate any order, quantity or importance, but are merely used to distinguish different components. The word "comprise" or "include" or the like means that an element or item appearing before such a word covers listed elements or items appearing after the word and equivalents thereof, and does not exclude other elements or items. The words "inside", "outside", "upper", "lower" and the like are only used to indicate a relative positional relationship. When the absolute position of a described object changes, its relative positional relationship may also change accordingly.

Some implementations of an optical assembly, a liquid crystal display panel, and a display apparatus provided in embodiments of the disclosure are described in detail below with reference to the accompanying drawings.

Figure 1:
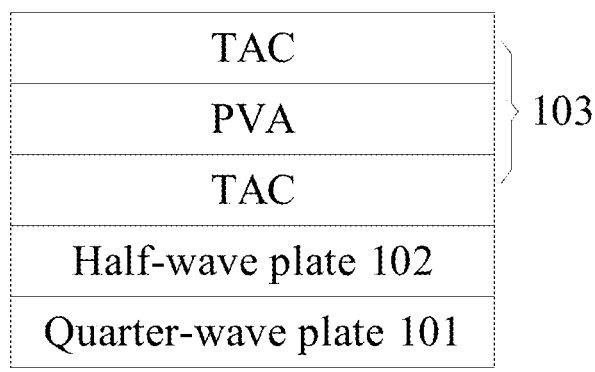
FIG. 1 is a schematic structural diagram of an optical assembly according to an embodiment of the disclosure.

An optical assembly 100 provided in an embodiment of the disclosure, as shown in FIG. 1, includes a quarter-wave plate 101, a half-wave plate 102 and a linear polarizer 103 stacked successively.

Figure 2:
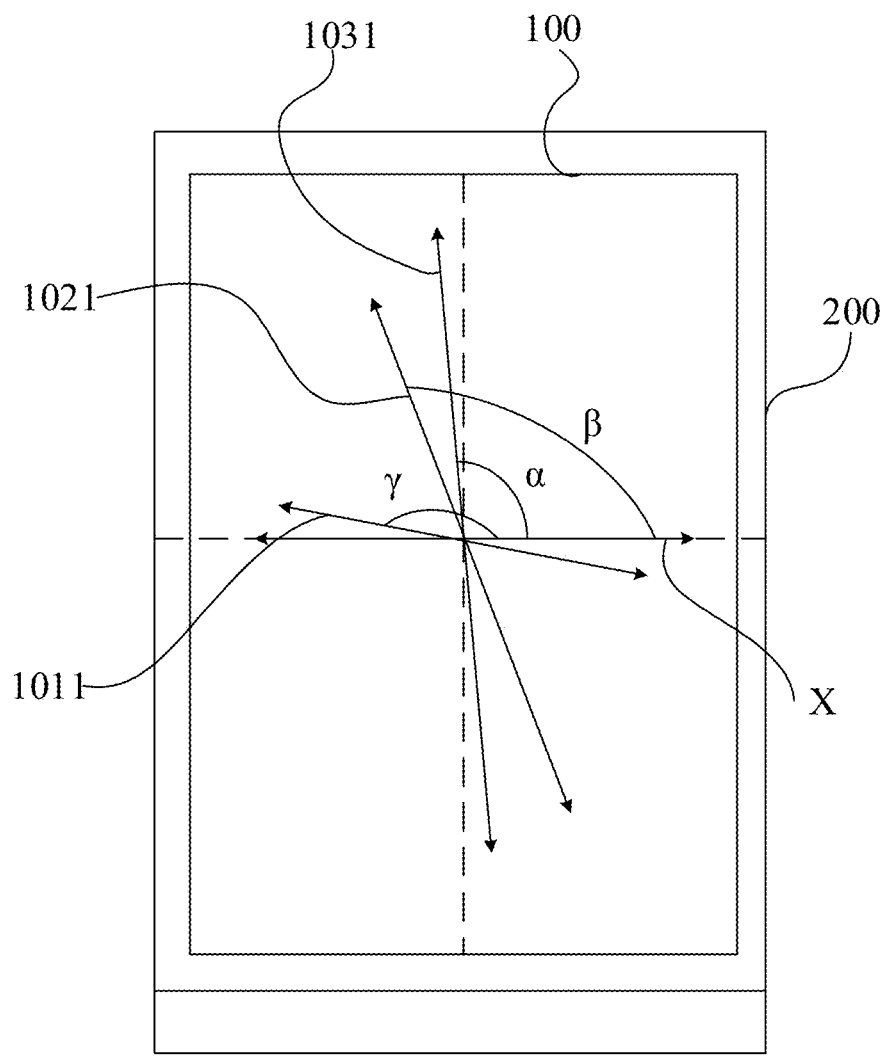
FIG. 2 is a schematic axial diagram of components of the optical assembly shown in FIG. 1.

As shown in FIG. 2, a first included angle α between an absorption axis direction 1301 of the linear polarizer 103 and a first direction X is 90° to 100°;

a second included angle β between a slow axis direction 1021 of the half-wave plate 102 and the first direction X is 107° to 114°; and a third included angle γ between a slow axis direction 1011 of the quarter-wave plate 101 and the first direction X is 164° to 176°.

The absorption axis direction 1031 of the linear polarizer, the slow axis direction 1021 of the half-wave plate, the slow axis direction 1011 of the quarter-wave plate, and the first direction X are all parallel to the linear polarizer 103, and are all perpendicular to a thickness direction of the linear polarizer 103.

As used herein, the first included angle α is obtained by rotating from the first direction X to the absorption axis direction 1031 of the linear polarizer 103 counterclockwise in a plane parallel to the linear polarizer; the second included angle β is obtained by rotating from the first direction X to the slow axis direction 1021 of the half-wave plate 102 counterclockwise in a plane parallel to the linear polarizer; and the third included angle γ is obtained by rotating from the first direction X to the slow axis direction 1011 of the quarter-wave plate 101 counterclockwise in a plane parallel to the linear polarizer. In addition, included angles between the first direction X and other directions mentioned herein are also obtained by rotating from the first direction X to the other directions counterclockwise in planes parallel to the linear polarizer.

In some embodiments, the first direction X is the left-right extending direction of the plane shown in FIG. 2. The first direction is used as a reference direction for determining the absorption axis direction 1031 of the linear polarizer 103, the slow axis direction 1021 of the half-wave plate 102, and the slow axis direction 101 of the quarter-wave plate 101. A person skilled in the art should understood that, in other embodiments, the first direction can also be any direction in a plane parallel to the linear polarizer, provided that positions of the absorption axis direction 1031 of the linear polarizer 103, the slow axis direction 1021 of the half-wave plate 102, and the slow axis direction 101 of the quarter-wave plate 101 relative to the first direction X are guaranteed.

It should be understood that, under the condition that the optical assembly 100 provided in some embodiments of the disclosure is placed on a horizontal plane and the quarter-wave plate 101 is on the horizontal plane, the first direction is a left-right extending direction of the horizontal direction. In the following embodiments, that the first direction is a left-right extending direction of the horizontal direction is used as an example for description.

In the optical assembly 100 provided in some embodiments of the disclosure, after passing through the linear polarizer 103, incident light is converted to first linearly polarized light, wherein the first included angle α between the absorption axis direction 1031 of the linear polarizer 103 and the first direction X is 90° to 100°, and an included angle between the polarization direction of the first linearly polarized light and the first direction X is 0° to 10'; after passing through the half-wave plate 102, the first linearly polarized light is converted to second linearly polarized light, wherein the second included angle β between the slow axis direction of the half-wave plate 102 and the first direction is 107° to 114°, and an included angle between the polarization direction of the second linearly polarized light and the first direction X is 34° to 48'; and the third included angle γ between the slow axis direction 1011 of the quarter-wave plate 101 and the first direction X is 164° to 176°. It can be learned that, an included angle between the polarization direction of the second linearly polarized light and the slow axis direction 1011 of the quarter-wave plate 101 is about 45°, such that after passing through the quarter-wave plate 101, the second linearly polarized light can be converted to circularly polarized light. Based on similar principles, circularly polarized light of the same rotation direction can be converted to linearly polarized light whose polarization direction is approximately parallel to the transmission axis of the linear polarizer 103, thereby opening an optical path. Therefore, due to the cooperation of the half-wave plate and the quarter-wave plate, the linear-circular conversion rate of the incident light can be improved effectively, thereby improving the luminance and contrast of a display apparatus including the optical assembly.

Optionally, to improve the linear-circular conversion rate of incident light, in the above-mentioned optical assembly 100 provided in the embodiment of the disclosure, the first included angle α between the absorption axis direction 1031 of the linear polarizer 103 and first direction X is 95®;

the second included angle β between the slow axis direction 1021 of the half-wave plate 102 and the first direction X is 110°; and the third included angle γ between the slow axis direction 1011 of the quarter-wave plate 101 and the first direction X is 170°.

In related technologies, both the quarter-wave plate 101 and the half-wave plate 102 have reverse wavelength dispersion characteristics in the visible light range, such that the quarter-wave plate and the half-wave plate cannot provide ideal phase compensation for optical equalization in different wavebands in visible light. Therefore, during mutual conversion between linearly polarized light and circularly polarized light, conversion efficiency of visible light varies with wavebands, resulting in low luminance (low reflectivity), low contrast, color deviation (yellowish and/or greenish), and other problems of an all-reflection LCD screen. Based on this, to improve the phase compensation effects of light of different wavebands in the visible light range, in the optical assembly 100 provided in the embodiment of the disclosure, the retardation of the half-wave plate 102 under the wavelength of 550 nm is 259 nm to 284 nm; and the retardation of the quarter-wave plate 101 under the wavelength of 550 nm is 100 nm to 110 nm.

Optionally, to improve the phase compensation effects of light of different wavebands in the visible light range, in the above-mentioned optical assembly 100 provided in the embodiment of the disclosure, the retardation of the half-wave plate 102 under the wavelength of 550 nm is 267 nm for example, and the retardation of the quarter-wave plate 101 under the wavelength of 550 nm is 110 nm.

Optionally, in the above-mentioned optical assembly provided in some embodiments of the disclosure, the relationship between the thickness $d_0$ of the half-wave plate 102 and its retardation $R_0$ under the wavelength of 550 nm is:

$$R_0 = (n_{x0} - n_{y0}) * d_0$$

where $n_{x0}$ and $n_{y0}$ are the refractive indexes of light of wavelength of 550 nm in two different directions (for example, the slow axis direction and the fast axis direction) on the half-wave plate 102.

Optionally, in the above-mentioned optical assembly provided in the embodiment of the disclosure, the relationship between the thickness $d_1$ of the quarter-wave plate 101 and its retardation $R_1$ under the wavelength of 550 nm is: $R_1 = (n_{x1} - n_{y1}) * d_1$ where $n_{x1}$ and $n_{y1}$ are refractive indexes of light of the wavelength of 550 nm in two different directions (for example, the slow axis and the fast axis) of the quarter-wave plate 101.

It should be noted that, in the above-mentioned optical assembly provided in some embodiments of the disclosure, as shown in FIG. 1, the linear polarizer 103 is of a TAC-PVA-TAC stacked structure, where PVA is an iodine or dye-based polyester film and is used to convert incident light to linearly polarized light; TAC is cellulose acetate and is used to protect the PVA layer. The half-wave plate 102 and the quarter-wave plate 101 are made of a uniaxially-stretched cyclo olefin polymer film (COP film). The half-wave plate 102 is used to implement part of phase compensation for incident light and/or emergent light, thereby increasing the linear-circular conversion efficiency of the quarter-wave plate 101 for visible light of different wavebands, improving white reflectivity, and reducing dark light leakage. The quarter-wave plate 101 is used together with a liquid crystal cell to implement π/2 phase compensation in the slow axis direction of incident light and/or emergent light, thereby achieving conversion between linearly polarized light and circularly polarized light, and opening and closing of an optical path of a reflective liquid crystal display panel. In addition, film layers of the linear polarizer 103 as well as the linear polarizer 103, the half-wave plate 102, and the quarter-wave plate 101 can be bonded via complex adhesive such as pressure-sensitive adhesive (PSA).

Figure 3:
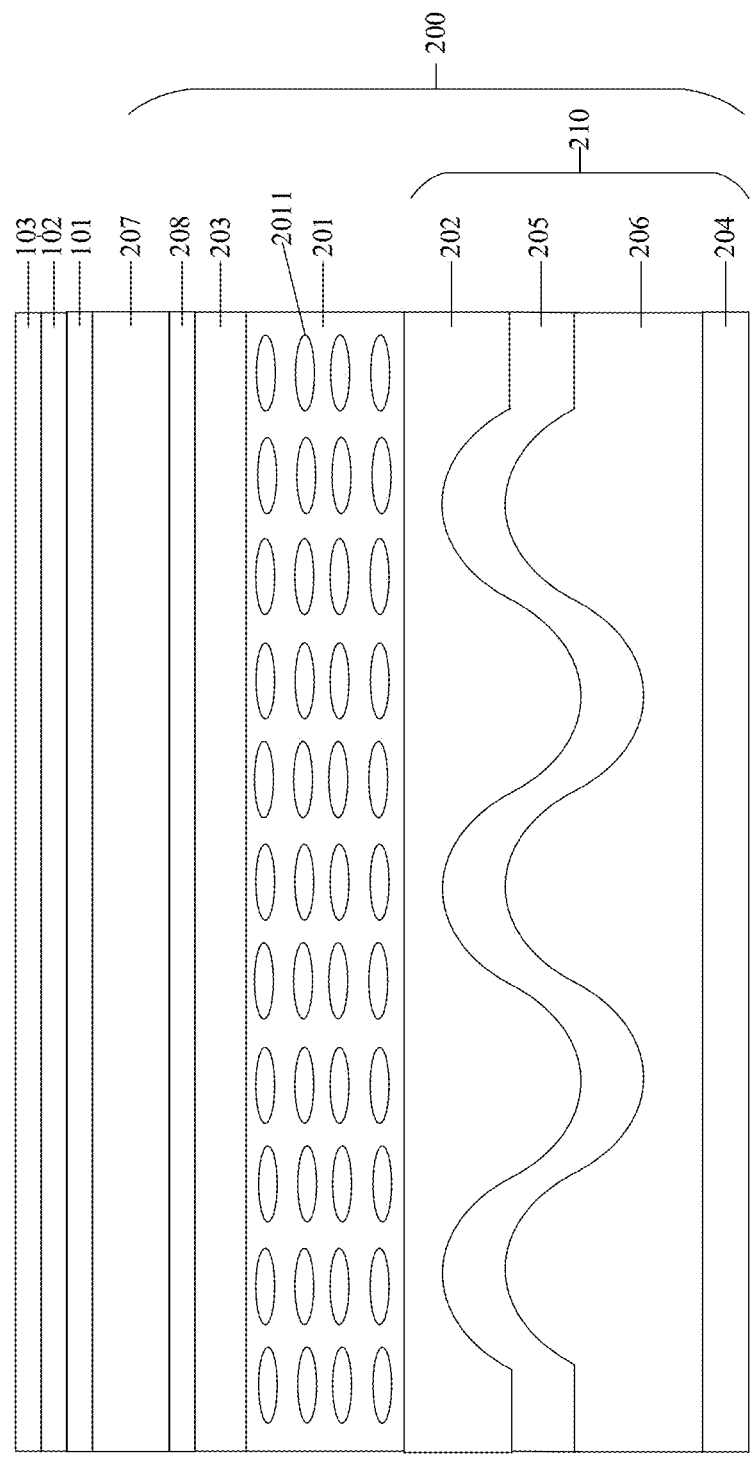
FIG. 3 is a schematic structural diagram of a liquid crystal display panel according to an embodiment of the disclosure.

Based on the same inventive concept, an embodiment of the disclosure provides a liquid crystal display panel. As shown in FIG. 3, the liquid crystal display panel includes the above-mentioned optical assembly 100, and a liquid crystal cell 200 on a side of the quarter-wave plate 101 away from the half-wave plate 102.

Optionally, in the above-mentioned liquid crystal display panel provided in some embodiments of the disclosure, as shown in FIG. 3, the liquid crystal cell 200 includes a liquid crystal layer 201 containing nematic liquid crystal molecules 2011. Based on the display principle of a normal-white reflective ECB-LCD, when the liquid crystal cell 200 is powered off, the nematic liquid crystal molecules 2011 are arranged in an initial orientation. In this case, refractive indexes of the nematic liquid crystal molecules 2011 in two directions in the liquid crystal display panel are different, so the liquid crystal cell 200 has a birefringence effect, and can be used together with the quarter-wave plate 101 to perform circular polarization-linear polarization conversion on incident light, thereby opening an optical path. When the liquid crystal cell 200 is powered on, the nematic liquid crystal molecules 2011 are erect. In this case, refractive indexes of the nematic liquid crystal molecules 2011 in two directions in the liquid crystal display panel are the same, so the liquid crystal cell 200 does not have the birefringence effect, and cannot perform linear-circular conversion on the incident light, thereby closing an optical path. Further details will be provided for principles of opening and closing an optical path. Therefore, the initial orientation of the nematic liquid crystal molecules 2011 is tightly related to the slow axis direction 1011 of the quarter-wave plate 101. Based on this, to improve the circular polarization-linear polarization conversion rate of incident light passing the quarter-wave plate 101, an included angle between the initial orientation of the nematic liquid crystal molecules 2011 and the slow axis direction 1011 of the quarter-wave plate 101 is set to 0° to 3°, that is, the initial orientation of the nematic liquid crystal molecules 2011 shifts −3° to +3° relative to the slow axis direction 1011 of the quarter-wave plate 101.

Optionally, in the above-mentioned liquid crystal display panel provided in some embodiments of the disclosure, as shown in FIG. 3, the initial orientation of the nematic liquid crystal molecules 2011 can be controlled by arranging a first orientation layer 202 and a second orientation layer 203 on two side of the liquid crystal layer 201.

In related technologies, the liquid crystal layer 201 has a reverse wavelength dispersion effect in the visible light range, so that the liquid crystal layer 201 cannot implement ideal phase compensation on light of different wavebands in the visible light range. Based on this, to improve the phase compensation effect of light of different wavebands in the visible light range, in the above-mentioned liquid crystal display panel provided in the embodiment of the disclosure, the retardation of the liquid crystal layer 201 under the wavelength of 550 nm is 143 nm to 190 nm.

Optionally, to improve the phase compensation effect of light of different wavebands in the visible light range, in the above-mentioned liquid crystal display panel provided in the embodiment of the disclosure, the retardation of the liquid crystal layer 201 under the wavelength of 550 nm is 170 nm.

Optionally, in the above-mentioned optical assembly provided in some embodiments of the disclosure, the relationship between the thickness $d_2$ of the liquid crystal layer 201 and the retardation R2 of the liquid crystal layer 201 under the wavelength of 550 nm is:

$$R_2 = (n_{x2} - n_{y2}) * d_2$$

where $n_{x2}$ and $n_{y2}$ are refractive indexes of light of wavelength of 550 nm in two different directions (for example, o-light direction and e-light direction) of the liquid crystal layer 201.

To better understand the technical solution of the liquid crystal display panel provided in embodiments of the disclosure, parameter setting solutions of the quarter-wave plate 101, half-wave plate 102, and nematic liquid crystal molecules 2011 are described below in detail.

Figure 4:
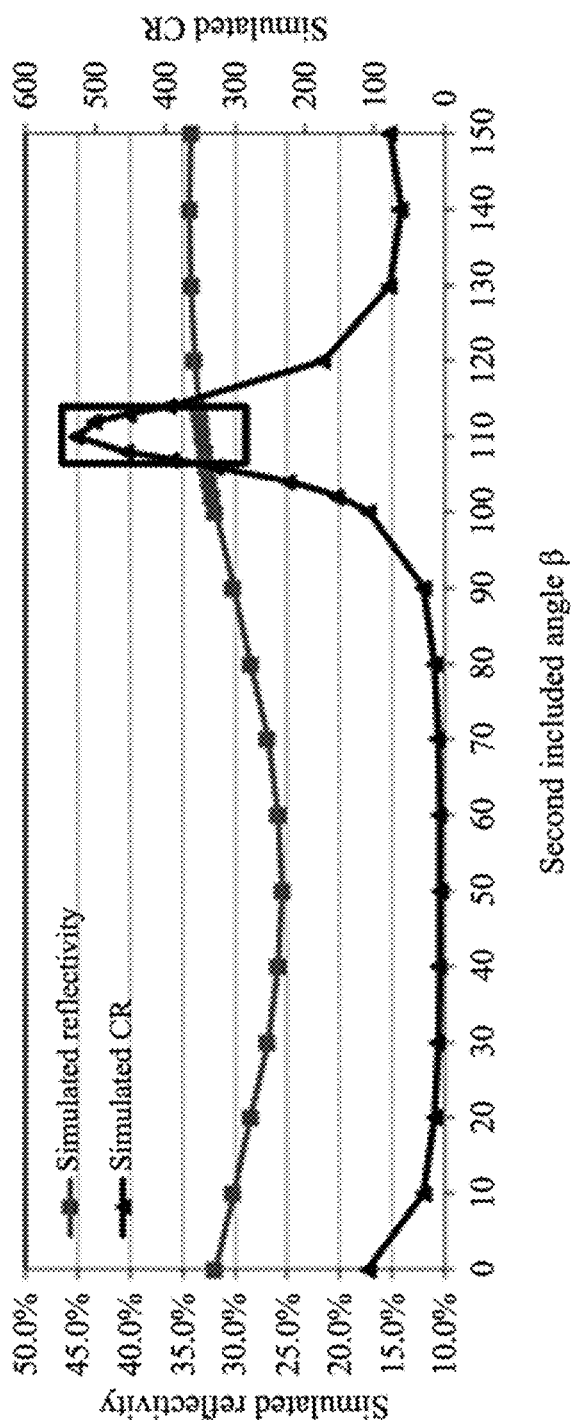
FIG. 4 shows curves of relationships between the slow axis direction of a half-wave plate and reflectivity and contrast of a liquid crystal display panel respectively according to an embodiment of the disclosure.

Based on the basic principle of polarization, after passing through the half-wave plate 102, linearly polarized light is still linearly polarized light, but the polarization direction is rotated by 2Ψ, where Ψ is an included angle between the linearly polarized light and the slow axis direction 1021 of the half-wave plate 102. When passing through the quarter-wave plate 101, if an included angle between the polarization direction of the linearly polarized light and the slow axis direction 1011 of the quarter-wave plate 101 is 45°, the linearly polarized light can be converted to circularly polarized light. Combinations of angles between the slow axes of the half-wave plate 102 and the quarter-wave plate 101 under each condition in Table 1 are designed based on the foregoing two basic principles. The results are shown in FIG. 4.

Optionally, 212 in Table 1 indicates the second included angle β between the slow axis direction 1021 of the half-wave plate 102 and the first direction λ; λ/4 indicates the third included angle γ between the slow axis direction 1021 of the quarter-wave plate 101 and the first direction X; and CR indicates the contrast of the liquid crystal display panel. Table 1 is designed under such a condition: the first included angle α between the absorption axis 1301 of the linear polarizer 103 and the first direction X (a direction perpendicular to the thickness direction of the polarizer 103) is 95°, the retardation of the half-wave plate 102 under the wavelength of 550 nm is 267 nm, the retardation of the quarter-wave plate 101 under the wavelength of 550 nm is 108 nm, the initial orientation of the nematic liquid crystal molecules 2011 is the same as the slow axis direction of the quarter-wave plate 101, and the retardation of the liquid crystal layer 201 containing the nematic liquid crystal molecules 2011 under the wavelength of 550 nm is 153 nm.

TABLE 1

| λ/2 (°) | λ/4 (°) | Reflectivity | CR |
|---|---|---|---|
| 0 | −50 | 31.9% | 109 |
| 10 | −30 | 30.2% | 30 |
| 20 | −10 | 28.5% | 14 |
| 30 | 10 | 26.9% | 9 |
| 40 | 30 | 25.9% | 7 |
| 50 | 50 | 25.5% | 6 |
| 60 | 70 | 25.9% | 7 |
| 70 | 90 | 26.9% | 9 |
| 80 | 110 | 28.5% | 14 |
| 90 | 130 | 30.2% | 30 |
| 100 | 150 | 31.9% | 109 |
| 102 | 154 | 32.2% | 134 |
| 104 | 158 | 32.4% | 224 |
| 106 | 162 | 32.7% | 326 |
| 107 | 164 | 32.8% | 391 |
| 108 | 166 | 32.9% | 455 |
| 110 | 170 | 33.1% | 527 |
| 112 | 174 | 33.3% | 501 |
| 113 | 176 | 33.4% | 452 |
| 114 | 178 | 33.5% | 395 |
| 120 | 190 | 33.9% | 174 |
| 130 | 210 | 34.2% | 79 |
| 140 | 230 | 34.3% | 63 |
| 150 | 250 | 34.2% | 79 |

With reference to Table 1 and FIG. 4, for comprehensive consideration of reflectivity and contrast of the liquid crystal display panel, the second included angle β between the slow axis direction 1021 of the half-wave plate 102 and the first direction X is 107° to 114° preferably. Correspondingly, the third included angle γ between the slow axis direction 1011 of the quarter-wave plate 101 and the first direction X is 164° to 176° preferably.

Figure 5:
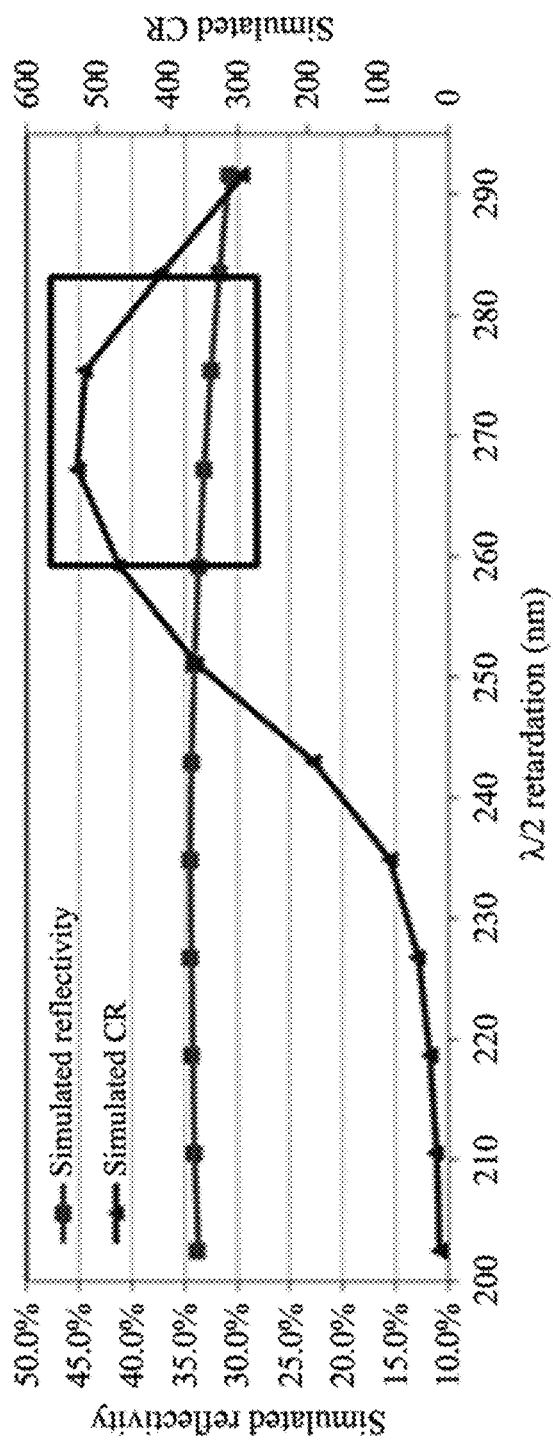
FIG. 5 shows curves of relationships between retardation of a half-wave plate and reflectivity and contrast of a liquid crystal display panel according to an embodiment of the disclosure.

Further, the retardation of the half-wave plate 102 is designed, as shown in Table 2 and FIG. 5. Optionally, λ/2 retardation in Table 2 indicates the retardation of the half-wave plate 102 under the wavelength of 550 nm, and CR indicates the contrast of the liquid crystal display panel. Table 2 is designed under such a condition: the first included angle α between the absorption axis 1031 of the linear polarizer 103 and the first direction X (a direction perpendicular to the thickness direction of the polarizer 103) is 95°, the second included angle β between the slow axis direction 1021 of the half-wave plate 102 and the first direction X is 110°, and the third included angle γ between the slow axis direction 1011 of the quarter-wave plate 101 and the first direction X is 170°, the retardation of the quarter-wave plate 101 under the wavelength of 550 nm is 108 nm, the initial orientation of the nematic liquid crystal molecules 2011 is the same as the slow axis direction 1011 of the quarter-wave plate 101, and the retardation of the liquid crystal layer 201 containing the nematic liquid crystal molecules 2011 under the wavelength of 550 nm is 153 nm.

With reference to Table 2 and FIG. 5, for comprehensive consideration of reflectivity and contrast of the liquid crystal display panel, the retardation of the half-wave plate 102 under the wavelength of 550 nm is 259 to 284 nm preferably.

TABLE 2

| λ/2 retardation (nm) | Reflectivity | CR |
|---|---|---|
| 203 | 33.8% | 12 |
| 211 | 34.1% | 17 |
| 219 | 34.3% | 26 |
| 227 | 34.4% | 43 |
| 235 | 34.4% | 83 |
| 243 | 34.3% | 193 |
| 251 | 34.1% | 359 |
| 259 | 33.7% | 469 |
| 267 | 33.1% | 527 |
| 275 | 32.5% | 517 |
| 284 | 31.7% | 408 |
| 292 | 30.7% | 293 |

Figure 6:
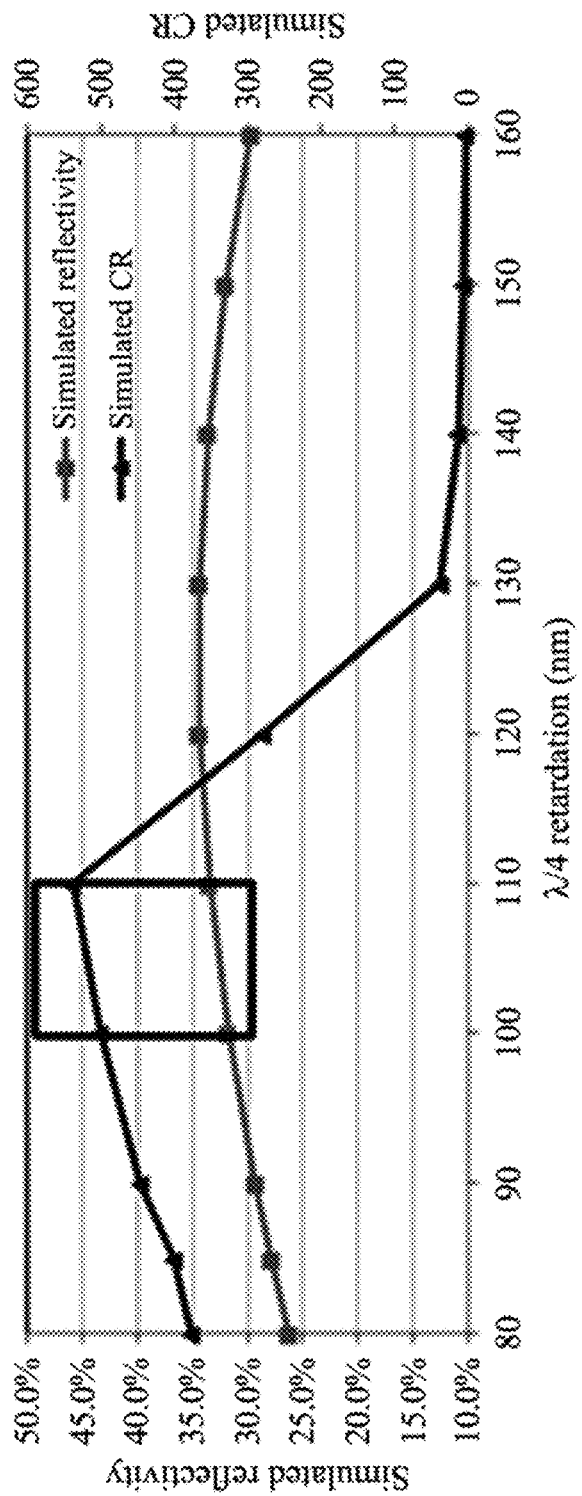
FIG. 6 shows curves of relationships between retardation of a quarter-wave plate and reflectivity and contrast of a liquid crystal display panel according to an embodiment of the disclosure.

Further, the retardation of the quarter-wave plate 101 is designed, as shown in Table 3 and FIG. 6. Specifically, λ/4 retardation in Table 3 indicates the retardation of the quarter-wave plate 101 under the wavelength of 550 nm, and CR indicates the contrast of the liquid crystal display panel. Table 3 is designed under such a condition: the first included angle α between the absorption axis direction 1031 of the linear polarizer 103 and the first direction X (a direction perpendicular to the thickness direction of the polarizer 103) is 95°, the second included angle β between the slow axis direction 1021 of the half-wave plate 102 and the first direction X is 110°, the retardation of the half-wave plate 102 under the wavelength of 550 nm is 267 nm, the third included angle γ between the slow axis direction 1011 of the quarter-wave plate 101 and the first direction X is 170°, the initial orientation of the nematic liquid crystal molecules 2011 is the same as the slow axis direction of the quarter-wave plate 101, and the retardation of the liquid crystal layer 201 containing the nematic liquid crystal molecules 2011 under the wavelength of 550 nm is 153 nm.

With reference to Table 3 and FIG. 6, for comprehensive consideration of reflectivity and contrast of the liquid crystal display panel, the retardation of the quarter-wave plate 101 under the wavelength of 550 nm is 100 nm to 110 nm preferably.

TABLE 3

| λ/4 retardation (nm) | Reflectivity | CR |
|---|---|---|
| 80 | 26.3% | 377 |
| 85 | 27.9% | 400 |
| 90 | 29.3% | 476 |
| 100 | 31.8% | 501 |
| 110 | 33.5% | 539 |
| 120 | 34.4% | 278 |
| 130 | 34.4% | 38 |
| 140 | 33.6% | 13 |
| 150 | 32.0% | 7 |
| 160 | 29.7% | 4 |

Based on the display principle of a normal-white reflective electronically-controlled birefringence liquid crystal display panel, when the liquid crystal cell 200 is powered off, the nematic liquid crystal molecules 2011 are arranged in an initial orientation. In this case, refractive indexes of the liquid crystal layer 201 containing the nematic liquid crystal molecules 2011 in two directions in the liquid crystal display panel are different, so the liquid crystal cell 200 has a birefringence effect, and can be used together with the quarter-wave plate 101 to perform circular polarization-linear polarization conversion on incident light and/or reflected light, thereby opening an optical path. When the liquid crystal cell 200 is powered on, the nematic liquid crystal molecules 2011 are erect. In this case, refractive indexes of the nematic liquid crystal molecules 2011 in two directions in the liquid crystal display panel are the same, so the liquid crystal cell 200 does not have the birefringence effect, and cannot perform circular polarization-linear polarization conversion on incident light and/or reflected light, thereby closing an optical path. Therefore, the initial orientation of the nematic liquid crystal molecules 2011 is tightly related to the slow axis direction of the quarter-wave plate 101. Based on this, difference between the initial orientation of the nematic liquid crystal molecules 2011 and the slow axis direction 1011 of the quarter-wave plate 101 is designed, as shown in Table 4 and FIG. 7.

Optionally, LC initial orientation angle in Table 4 indicates an included angle between the initial orientation of the nematic liquid crystal molecules 2011 and the first direction X, CR indicates the contrast of the liquid crystal display panel. Table 4 is designed under such a condition: the first included angle α between the absorption axis direction 1031 of the linear polarizer 103 and the first direction X (a direction perpendicular to the thickness direction of the polarizer 103) is 95°, the second included angle β between the slow axis direction 1021 of the half-wave plate 102 and the first direction is 110°, the retardation of the half-wave plate 102 under the wavelength of 550 nm is 267 nm, the third included angle γ between the slow axis direction 1011 of the quarter-wave plate 101 and the first direction X is 170°, the retardation of the quarter-wave plate 101 under the wavelength of 550 nm is 108 nm, and the retardation of the nematic liquid crystal molecules 2011 under the wavelength of 550 nm is 153 nm.

TABLE 4

| LC initial orientation angle (°) | Reflectivity | CR |
|---|---|---|
| 0 | 33.5% | 62 |
| 20 | 34.6% | 12 |
| 40 | 33.7% | 6 |
| 60 | 30.7% | 4 |
| 80 | 29.1% | 3 |
| 100 | 31.0% | 4 |
| 120 | 33.9% | 6 |
| 140 | 34.4% | 14 |
| 160 | 33.3% | 95 |
| 164 | 33.2% | 232 |
| 165 | 33.2% | 301 |
| 166 | 33.1% | 390 |
| 167 | 33.1% | 490 |
| 168 | 33.1% | 570 |
| 169 | 33.1% | 586 |
| 170 | 33.1% | 527 |
| 171 | 33.1% | 505 |
| 172 | 33.2% | 492 |
| 173 | 33.2% | 482 |
| 174 | 33.2% | 200 |
| 175 | 33.2% | 157 |
| 176 | 33.3% | 126 |

Figure 7:
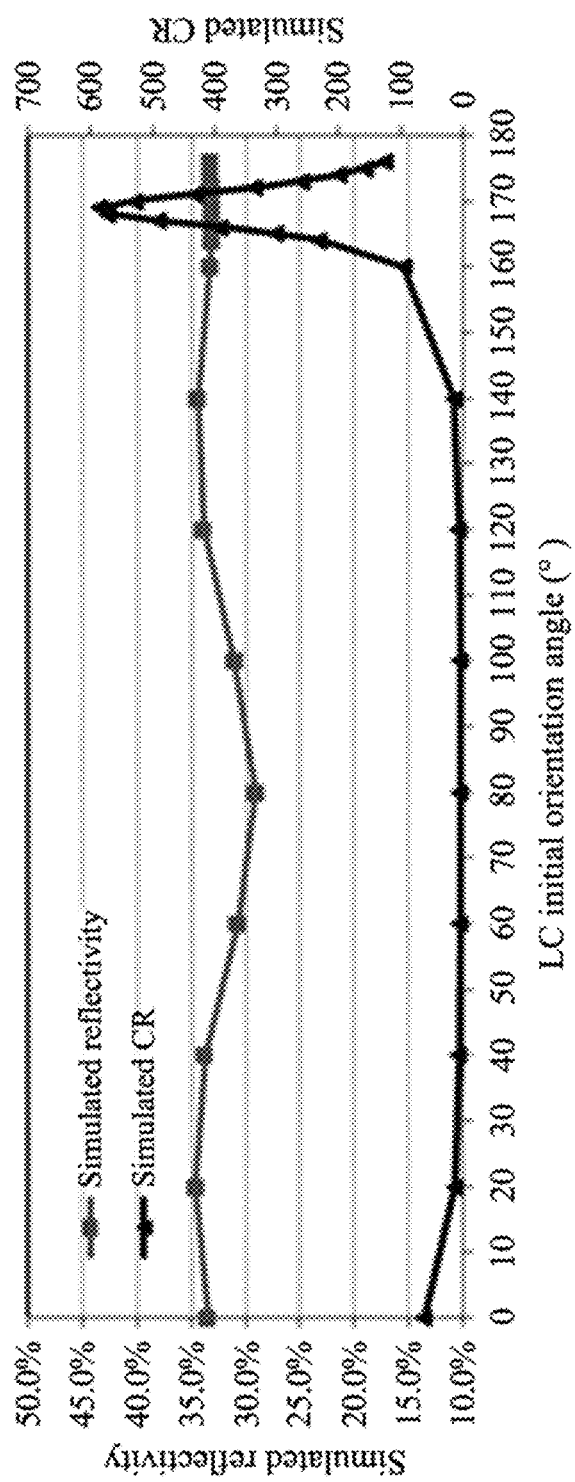
FIG. 7 shows curves of relationships between the initial orientation direction of a nematic liquid crystal molecule and reflectivity and contrast of a liquid crystal display panel respectively according to an embodiment of the disclosure.

With reference to Table 4 and FIG. 7, for comprehensive consideration of reflectivity and contrast of the liquid crystal display panel, the angle between the initial orientation of the nematic liquid crystal molecules 2011 and the slow axis direction 1011 of the quarter-wave plate 101 is −3° to +3° preferably.

Figure 8:
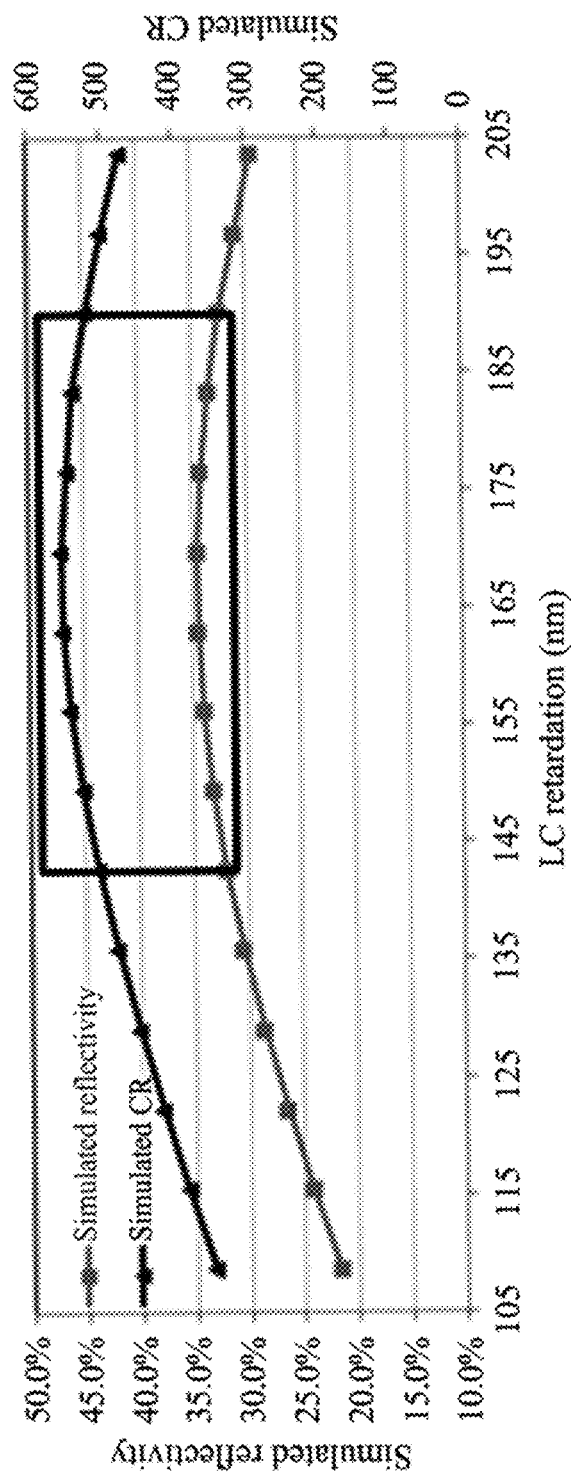
FIG. 8 shows curves of relationships between retardation of a nematic liquid crystal molecule and reflectivity and contrast of a liquid crystal display panel according to an embodiment of the disclosure.

Further, the retardation of the liquid crystal layer 201 containing the nematic liquid crystal molecules 2011 is designed, as shown in Table 5 and FIG. 8. Specifically, LC retardation in Table 5 indicates the retardation of the liquid crystal layer 201 containing the nematic liquid crystal molecules 2011 under the wavelength of 550 nm, and CR indicates the contrast of the liquid crystal display panel. Table 5 is designed under such a condition: the first included angle α between the absorption axis direction 1031 of the linear polarizer 103 and the first direction X (a direction perpendicular to the thickness direction of the polarizer 103) is 95°, the second included angle β between the slow axis direction 1021 of the half-wave plate 102 and the first direction X is 110°, the retardation of the half-wave plate 102 under the wavelength of 550 nm is 267 nm, the third included angle γ between the slow axis direction 1011 of the quarter-wave plate 101 and the first direction X is 170°, and the initial orientation of the nematic liquid crystal molecules 2011 is the same as the slow axis direction 1011 of the quarter-wave plate 101, that is, 170°.

TABLE 5

| LC retardation (nm) | Reflectivity | CR |
|---|---|---|
| 109 | 21.7% | 348 |
| 115 | 24.2% | 385 |
| 122 | 26.5% | 419 |
| 129 | 28.6% | 451 |
| 136 | 30.4% | 481 |
| 143 | 31.9% | 507 |
| 149 | 33.1% | 527 |
| 156 | 34.0% | 544 |
| 163 | 34.4% | 554 |
| 170 | 34.5% | 556 |
| 177 | 34.1% | 548 |
| 183 | 33.4% | 540 |
| 190 | 32.4% | 521 |
| 197 | 30.8% | 499 |
| 204 | 29.5% | 472 |

With reference to Table 5 and FIG. 8, for comprehensive consideration of reflectivity and contrast of the liquid crystal display panel, the retardation of the liquid crystal layer 201 containing the nematic liquid crystal molecules 2011 under the wavelength of 550 nm is 143 to 190 nm preferably.

Optionally, in the above-mentioned liquid crystal display panel provided in some embodiments of the disclosure, the liquid crystal cell 200 includes an array substrate 210, as shown in FIG. 3. The array substrate 210 includes a base substrate 204 (hereinafter referred to as second base substrate 204) and a plurality of reflective pixel electrodes 205 arranged on the base substrate 204. To further improve the luminance of the reflective liquid crystal display panel and reduce mirror reflection for enlarging the viewing angle range, the array substrate may further include a resin layer 206 that is arranged between the base substrate 204 and the layer of each reflective pixel electrode 205 and that is of a concave-convex structure, as shown in FIG. 3.

Complying with the structure of the resin layer 206, the reflective pixel electrodes 205 have the same concave-convex structures as that of the resin layer 206, so that diffuse reflection of incident light occurs on the reflective pixel electrodes 205, thereby enlarging the viewing angle range.

Figure 9:
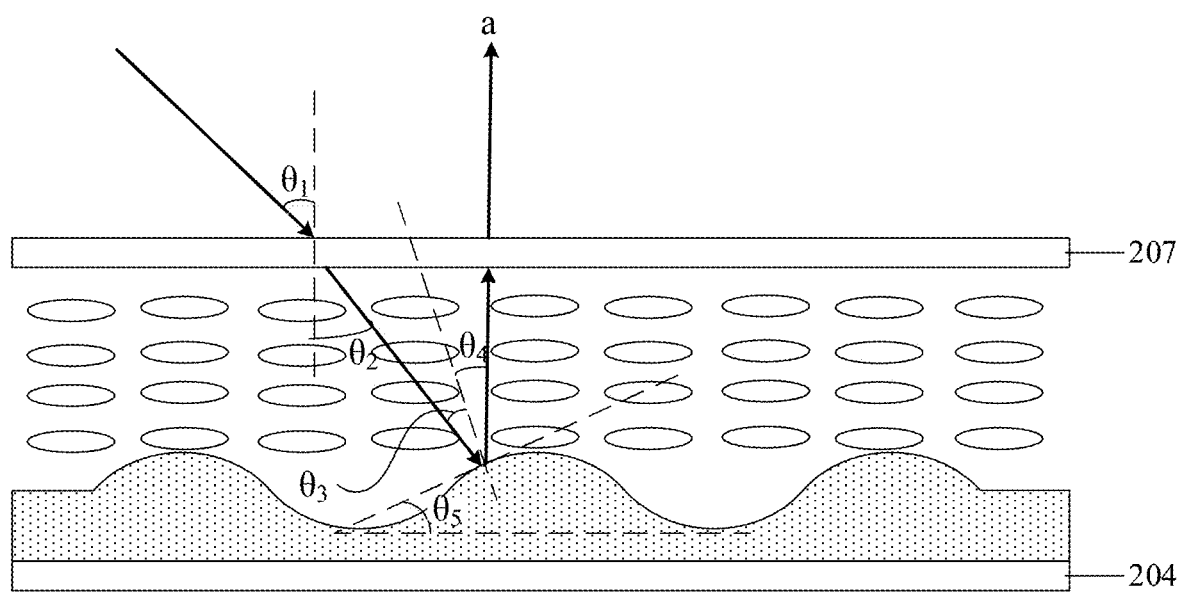
FIG. 9 is a reflection principle diagram of a concave-convex structure according to an embodiment of the disclosure.

At present, the evaluation method of the reflective liquid crystal display panel is mainly to evaluate reflectivity and contrast of the reflective liquid crystal display panel under a main viewing angle (the angle between the main viewing angle and direction a is −5° to +5°) in such a manner: incident light enters the reflective liquid crystal display panel at an angle of 30°, as shown in FIG. 9.

According to the law of refraction, the following formula is obtained:

$$\frac{\sin\theta_1}{\sin\theta_2} = \frac{n_{cell}}{n_{air}}$$

where $\theta_1$ indicates the incidence angle of light and is 30°; $\theta_2$ indicates the refraction of light in the liquid crystal display panel; $n_{cell}$ indicates the refractive index of the liquid crystal display panel and is about 1.5; and $n_{air}$ indicates the refractive index of air and is 1. Therefore, the refraction angle $\theta_2$ is arcsin (⅓).

In addition, according to the law of reflection, the following formula is obtained:

$$\theta_3 = \theta_4 = \theta_5 = \frac{\theta_2}{2} \approx 10°(\pm 5°)$$

where $\theta_3$ indicates the incidence angle of light on the concave-convex structure, $\theta_4$ indicates the reflection angle of light on the concave-convex structure, and $\theta_5$ indicates the slope angle of light on the concave-convex structure.

Based on this, in the above-mentioned liquid crystal display panel provided in some embodiments of the disclosure, the slope of the concave-convex structure can be set to 5° to 15°, thereby improving the luminance of the liquid crystal display panel from the main viewing angle, and enlarging the viewing angle range.

Optionally, the above-mentioned liquid crystal display panel provided in the embodiment of the disclosure structurally includes a second base substrate 204, a transistor layer, a resin layer 206 of a concave-convex structure, a reflective pixel electrode 205, a second orientation layer 203, a liquid crystal layer 201 containing nematic liquid crystal molecules 2011, a first orientation layer 202, a common electrode layer 208, a first base substrate 207, a quarter-wave plate 101, a half-wave plate 102, and a linear polarizer 103 from the bottom up in sequence. In addition, the liquid crystal display panel further includes components that are known to people skilled in the art, such as light filters. This is not limited therein.

Optionally, the resin layer of the concave-convex structure can be prepared in the following manner: first, coat a layer of resin on an array substrate in a spin-coating method for a certain thickness; then place a light shield having concave-convex (bump) patterns on the resin; and perform exposure, developing, and etching. Moreover, reflective pixel electrodes 205 of concave-convex structures can be formed on the resin layer through deposition of reflective metal.

The working principle of the above-mentioned liquid crystal display panel provided in some embodiments of the disclosure is as follows.

Figure 10:
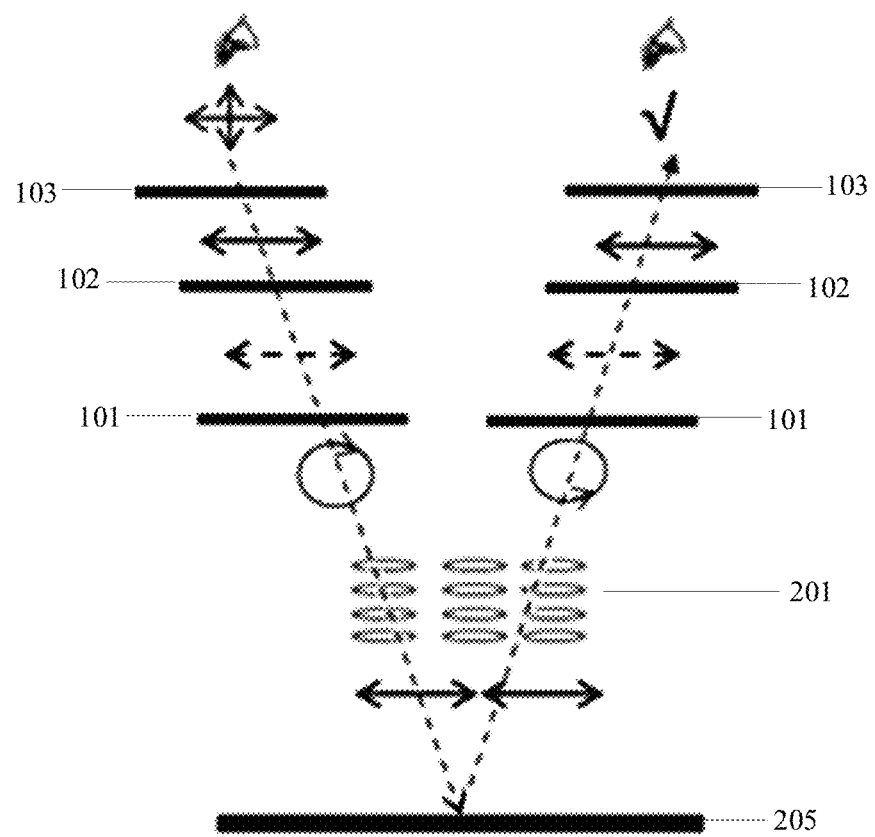
FIG. 10 is a schematic principle diagram of a liquid crystal display panel in a bright state according to an embodiment of the disclosure.

As shown in FIG. 10, when the liquid crystal display panel is powered off, after passing through the linear polarizer 103, the half-wave plate 102, and the quarter-wave plate 101 sequentially, incident light is converted to dextrorotatory circularly polarized light. Because the nematic liquid crystal molecules 2011 are arranged in the initial orientation, refractive indexes of the liquid crystal layer 201 containing the nematic liquid crystal molecules 2011 in two directions in the liquid crystal display panel are different, the liquid crystal layer 201 has a birefringence effect on the dextrorotatory circularly polarized light. After passing through the liquid crystal layer 201, the dextrorotatory polarized light is converted to linearly polarized light. After the linearly polarized light is reflected by the reflective pixel electrodes 205, the polarization direction of the linearly polarized light is not changed. After passing through the liquid crystal layer 201, the reflected linearly polarized light is converted to dextrorotatory circularly polarized light, that is, after passing through the liquid crystal cell 200 twice, dextrorotatory polarized light is still dextrorotatory circularly polarized light. After passing through the quarter-wave plate 101 and the half-wave plate 102 sequentially, the reflected dextrorotatory circularly polarized light is converted to linearly polarized light whose polarization direction is perpendicular to the absorption axis of the linear polarizer 103, and is emitted, thereby achieving bright-state display.

Figure 11:
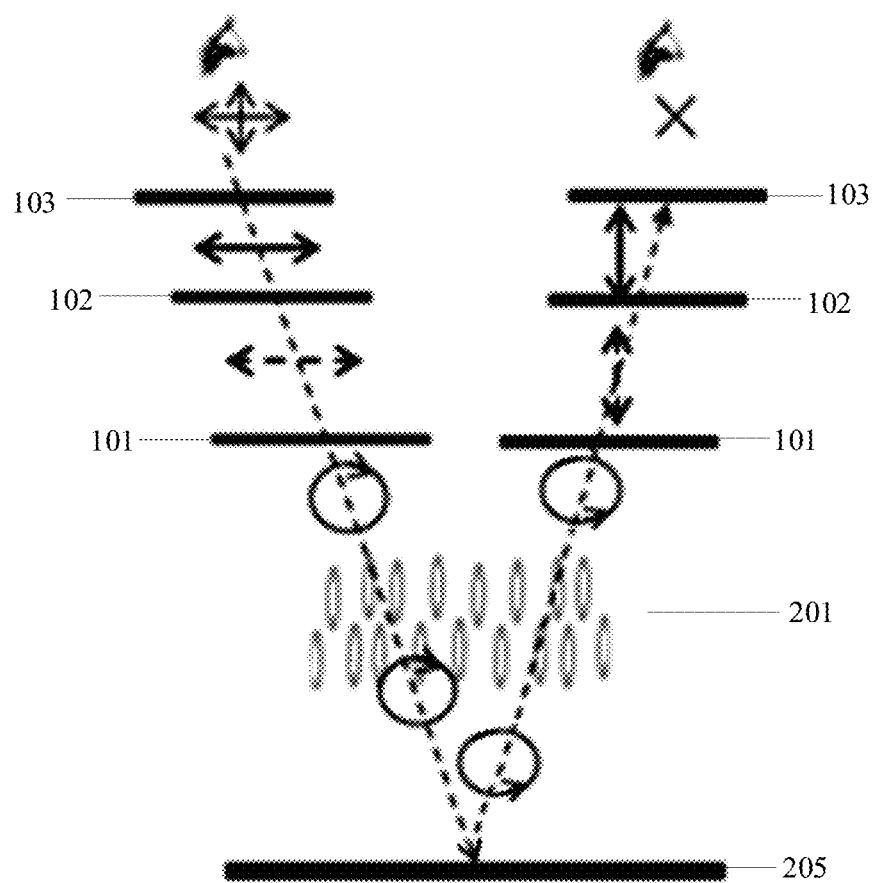
FIG. 11 is a schematic principle diagram of a liquid crystal display panel in a dark state according to an embodiment of the disclosure.

As shown in FIG. 11, when the liquid crystal display panel is powered on, the nematic liquid crystal molecules 2011 are erect. In this case, refractive indexes of the liquid crystal layer containing the nematic liquid crystal molecules 2011 in two directions in the liquid crystal display panel are the same. Therefore, the liquid crystal cell 200 does not have the birefringence effect. After passing through the linear polarizer 103, the half-wave plate 102, and the quarter-wave plate 101 sequentially, incident light is converted to dextrorotatory circularly polarized light; when passing through the liquid crystal layer 201, the dextrorotatory circularly polarized light is reflected by the reflective pixel electrodes 205 and is converted to levorotatory circularly polarized light for emission; after passing through the liquid crystal layer 201, the quarter-wave plate 101, and the half-wave plate 102, the levorotatory circularly polarized light is converted into linearly polarized light whose polarization direction is parallel to the absorption axis of the linear polarizer 103, and is blocked. Therefore, the liquid crystal display panel is dark.

Figure 12:
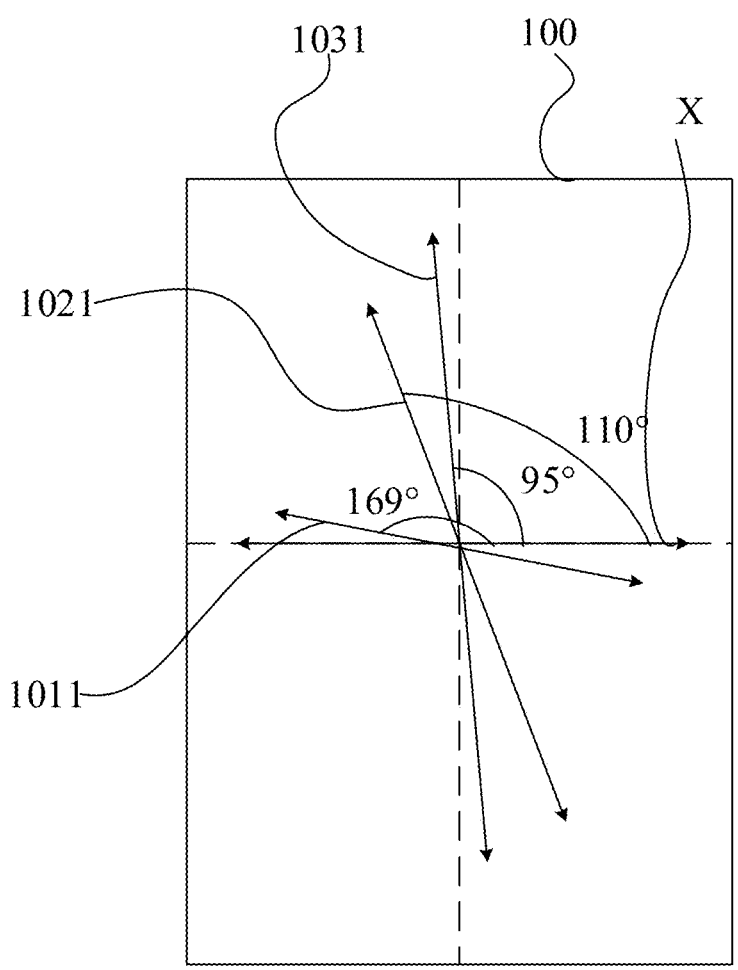
FIG. 12 is a schematic axial diagram of components of an optical assembly according to an embodiment of the disclosure and a first comparison embodiment.
Figure 13:
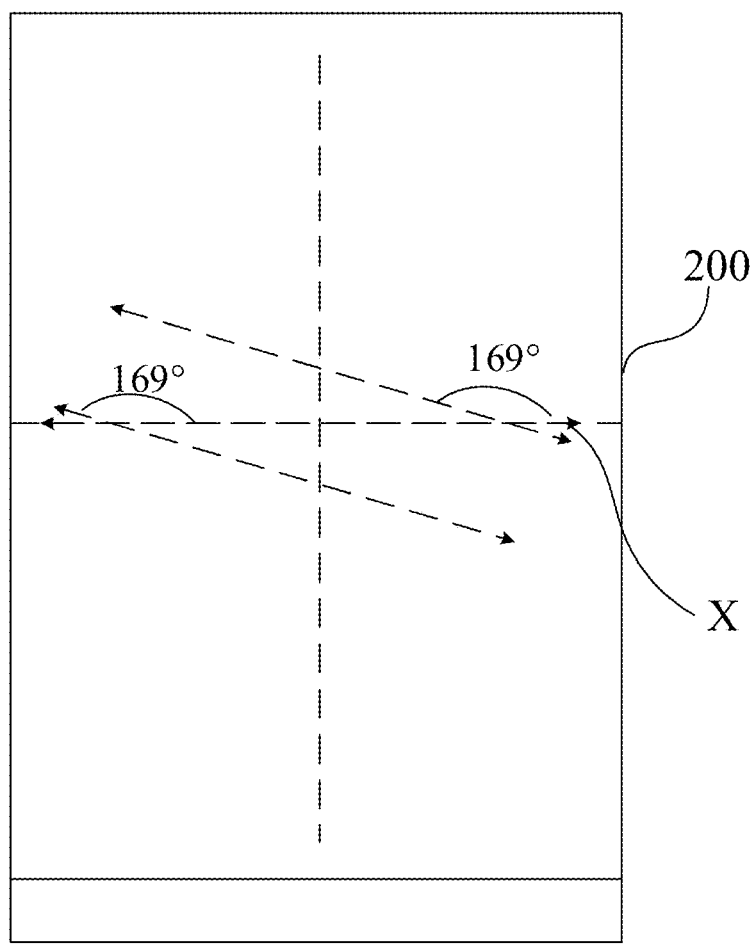
FIG. 13 shows the initial orientation direction of a nematic liquid crystal molecule according to an embodiment of the disclosure and the first comparison embodiment.
Figure 14:
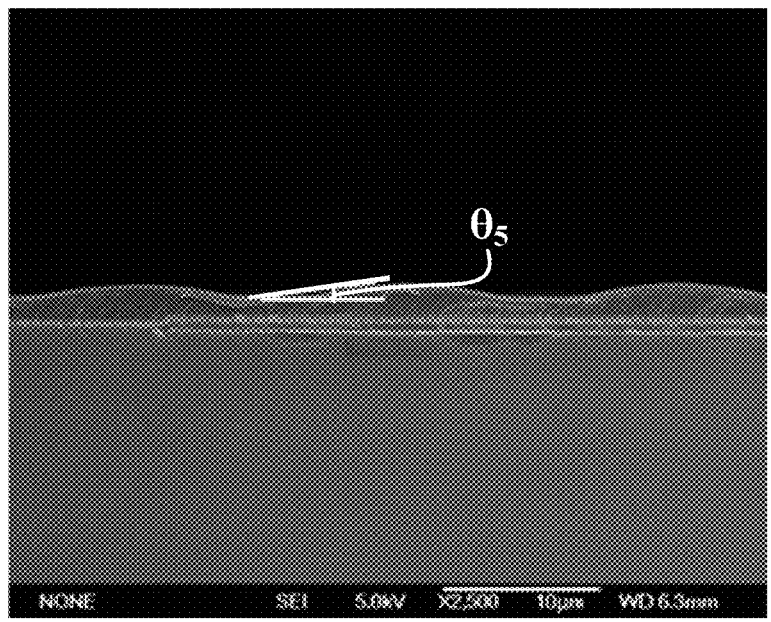
FIG. 14 shows a concave-convex structure according to an embodiment of the disclosure and a second comparison embodiment.

The following uses a set of comparative experiments to show that the above-mentioned liquid crystal display panel provided in the embodiment of the disclosure has relatively high linear polarization-circular polarization conversion rate, reflectivity, and contrast. In comparison embodiments provided in some embodiments of the disclosure, structures of the liquid crystal display panels are similar, as shown in FIG. 3. The difference lies in that:

as shown in FIG. 12, in the liquid crystal display panel provided in some embodiments of the disclosure, the first included angle α between the absorption axis direction 1031 of the linear polarizer 103 and the first direction X is 95% the half-wave plate 102 is made of a cyclo olefin polymer film (COP film); the retardation of the half-wave plate 102 under the wavelength of 550 nm is 267 nm; the second included angle β between the slow axis direction 1021 of the half-wave plate 102 and the first direction X is 110% the quarter-wave plate 101 is made of a polymer film; the retardation of the quarter-wave plate 101 under the wavelength of 550 nm is 108 nm; and the third included angle γ between the slow axis 1011 of the quarter-wave plate 101 and the first direction X is 169°. As shown in FIG. 13, the nematic liquid crystal molecules 2011 are encapsulated in the liquid crystal cell 200, without using any chiral reagent. The initial orientation direction of the nematic liquid crystal molecules 2011 are the same as the slow axis direction 1011 of the quarter-wave plate 101, that is, 169°. The retardation of the liquid crystal layer 201 containing the nematic liquid crystal molecules 2011 under the wavelength of 550 nm is 153 nm. The slope angle $\theta_5$ of the concave-convex structure is 6° to 10°, as shown in FIG. 14.

Figure 15:
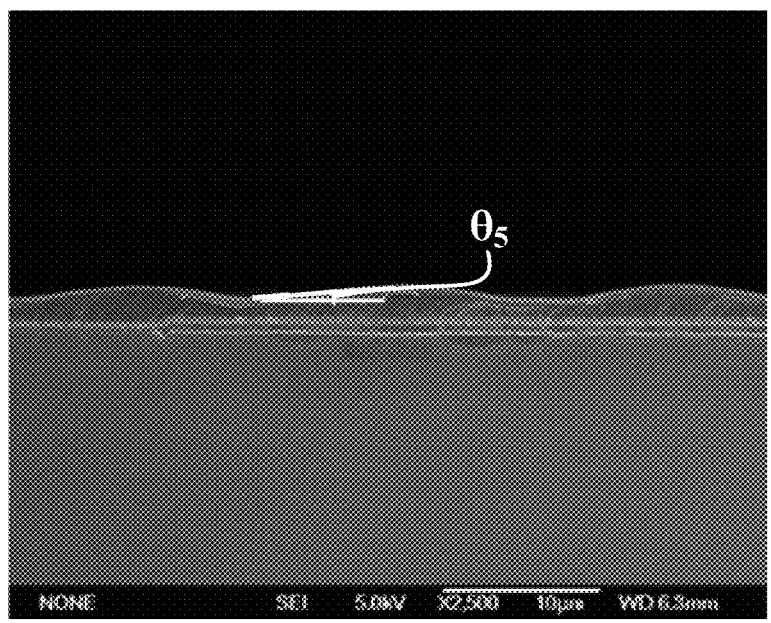
FIG. 15 shows a concave-convex structure according to the first comparison embodiment.

In a first comparison embodiment, as shown in FIG. 12, the first included angle α between the absorption axis direction 1031 of the linear polarizer 103 and the first direction X is 95% the half-wave plate 102 is made of a COP film; the retardation of the half-wave plate 102 under the wavelength of 550 nm is 267 nm; the second included angle β between the slow axis direction 1021 of the half-wave plate 102 and the first direction X is 110°; the quarter-wave plate 101 is made of a COP film; the retardation of the quarter-wave plate 101 under the wavelength of 550 nm is 108 nm; and the third included angle γ between the slow axis of the quarter-wave plate 101 and the first direction X is 169°. As shown in FIG. 13, the nematic liquid crystal molecules 2011 are encapsulated in the liquid crystal cell 200, without using any chiral reagent. The initial orientation direction of the nematic liquid crystal molecules 2011 are the same as the slow axis direction 1011 of the quarter-wave plate 101, that is, 169°. The retardation of the liquid crystal layer 201 containing the nematic liquid crystal molecules 2011 under the wavelength of 550 nm is 153 nm. The slope angle $\theta_5$ of the concave-convex structure is 3° to 5°, as shown in FIG. 15.

Figure 16:
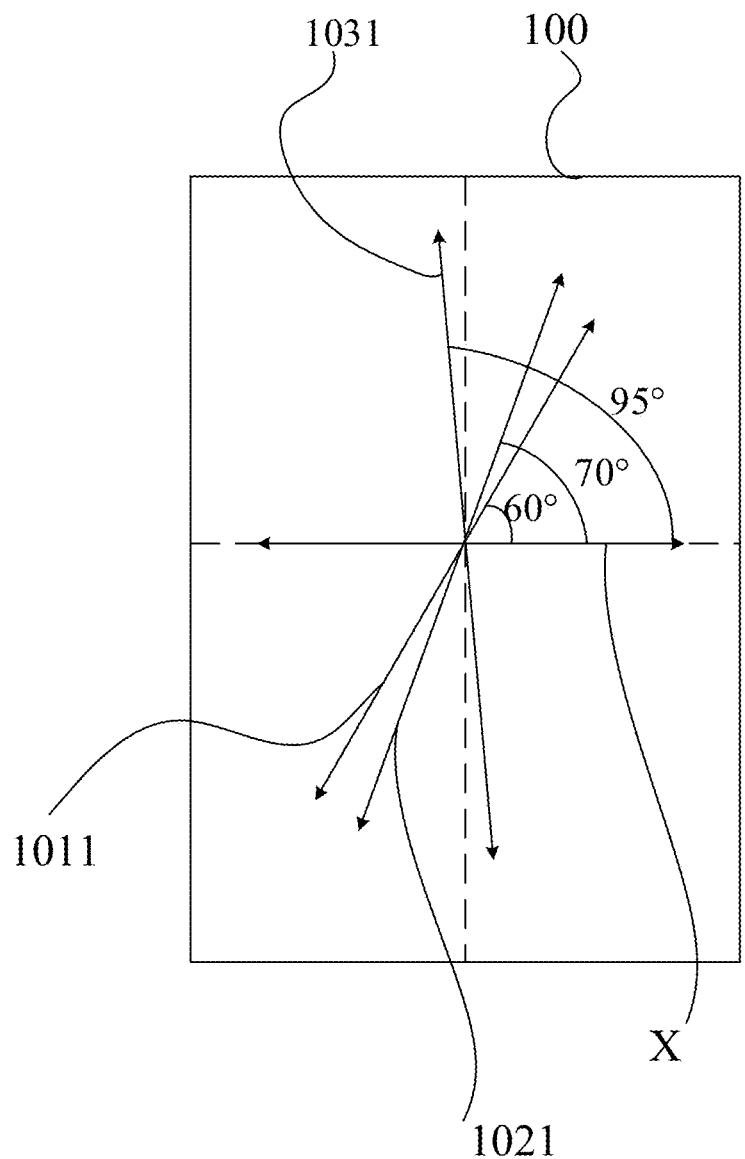
FIG. 16 is a schematic axial diagram of components of an optical assembly according to the second comparison embodiment.
Figure 17:
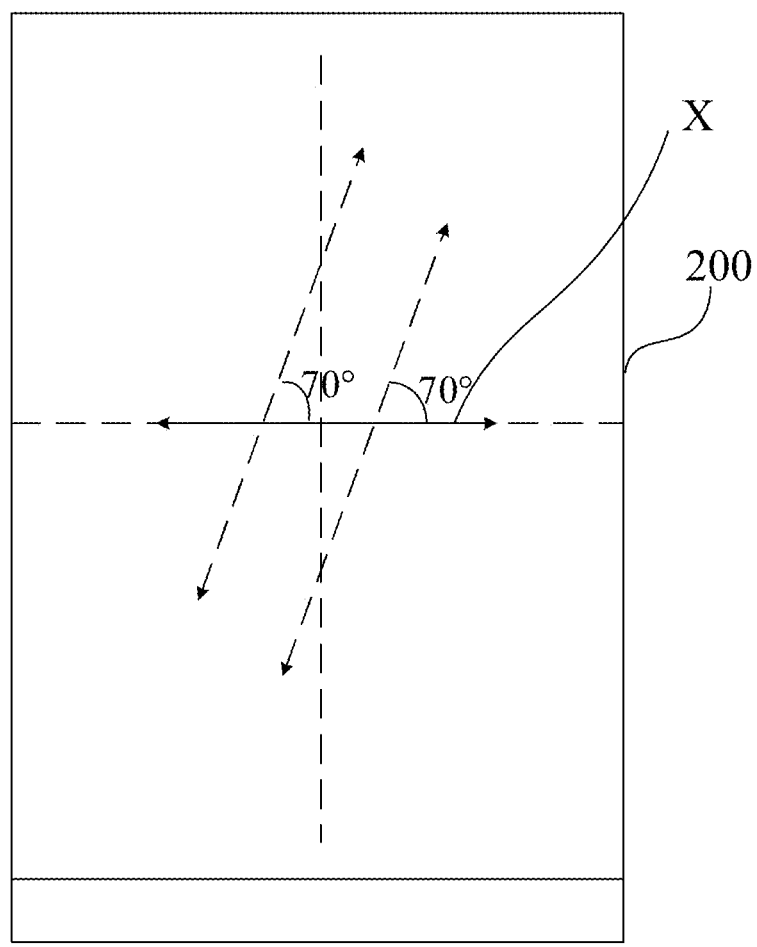
FIG. 17 shows the initial orientation direction of a nematic liquid crystal molecule according to the second comparison embodiment.

In a second comparison embodiment, as shown in FIG. 16, the first included angle α between the absorption axis direction 1031 of the linear polarizer 103 and the first direction X is 95'; the half-wave plate 102 is made of a COP film; the retardation of the half-wave plate 102 under the wavelength of 550 nm is 267 nm; the second included angle β between the slow axis direction 1021 of the half-wave plate 102 and the first direction X is 60'; the quarter-wave plate 101 is made of a COP film; the retardation of the quarter-wave plate 101 under the wavelength of 550 nm is 108 nm; and the third included angle γ between the slow axis of the quarter-wave plate 101 and the first direction X is 70°. As shown in FIG. 17, the nematic liquid crystal molecules 2011 are encapsulated in the liquid crystal cell 200, without using any chiral reagent. The initial orientation direction of the nematic liquid crystal molecules 2011 are the same as the slow axis direction 1011 of the quarter-wave plate 101, that is, 70°. The retardation of the liquid crystal layer 201 containing the nematic liquid crystal molecules 2011 under the wavelength of 550 nm is 153 nm. The slope angle $\theta_5$ of the concave-convex structure is 6° to 10°, as shown in FIG. 14.

TABLE 6

| Item | Embodiment | First comparison embodiment | Second comparison embodiment |
| --- | --- | --- | --- |
| Reflectivity | 30.0% | 16.6% | 23.5% |
| CR | 28.9 | 25.8 | 4.2 |

Table 6 shows test data of comparison groups provided in the embodiment of the disclosure. It can be learned that, the liquid crystal display panel in the embodiment of the disclosure has better reflectivity and contrast than those in the first comparison embodiment and the second comparison embodiment.

Based on the same utility model concept, an embodiment of the disclosure provides a display apparatus, including the above-mentioned liquid crystal display panel. The display apparatus may be any product or component with display functions, such as a mobile phone, a tablet computer, a TV, a monitor, a notebook computer, a digital photo frame, a navigator, a smart watch, a fitness wristband, and a personal digital assistant. The problem-solving principle of the display apparatus is similar to that of the above-mentioned liquid crystal display panel. Therefore, for implementation of the display apparatus, refer to that of the above-mentioned liquid crystal display panel. Repetition is no longer described.

Some embodiments of the disclosure provide the optical assembly, the liquid crystal display panel, and the display apparatus. The optical assembly includes a quarter-wave plate, a half-wave plate, and a linear polarizer stacked successively; an included angle between the absorption axis direction of the linear polarizer and a first direction is 90° to 100°; an included angle between the slow axis direction of the half-wave plate and the first direction is 107° to 114°; an included angle between the slow axis direction of the quarter-wave plate and the first direction is 164° to 176°; and the first direction is perpendicular to the thickness direction of the linear polarizer. After passing through the linear polarizer, incident light is converted to first linearly polarized light, wherein an included angle between the absorption axis direction of the linear polarizer and the first direction is 90° to 100°, an included angle between the polarization direction of the first linearly polarized light and the first direction is 0° to 10°. After passing through the half-wave plate, the first linearly polarized light is converted to second linearly polarized light, wherein an included angle between the slow axis direction of the half-wave plate and the first direction is 107° to 114°, and an included angle between the polarization direction of the second linearly polarized light and the first direction is 34° to 48°. The included angle between the slow axis direction of the quarter-wave plate and the first direction is 164° to 176°. In this case, an included angle between the polarization direction of the second linearly polarized light and the slow axis direction of the quarter-wave plate is about 45°, so that the second linearly polarized light can be converted into circularly polarized light after passing through the quarter-wave plate. Based on similar principles, after passing through the quarter-wave plate 101 and the half-wave plate 102 sequentially, circularly polarized light is converted to linearly polarized light whose polarization direction is approximately parallel to the transmission axis of the linear polarizer 103, thereby opening an optical path. Therefore, due to the cooperation of the half-wave plate and the quarter-wave plate described above, the linear-circular conversion rate of the incident light can be improved effectively, thereby improving the luminance and contrast of a display apparatus including the optical assembly. Obviously, a person skilled in the art can make various modifications and variations to the disclosure without departing from the spirit and scope of the disclosure. In this case, the disclosure is intended to cover these modifications and variations provided that they fall within the scope of protection defined by the following claims and their equivalent technologies.

What is claimed is:

1. A liquid crystal display panel, comprising: an optical assembly and a liquid crystal cell;
   wherein the optical assembly comprises: a quarter-wave plate, a half-wave plate, and a linear polarizer stacked successively, wherein an absorption axis direction of the linear polarizer, a slow axis direction of the half-wave plate, and a slow axis direction of the quarter-wave plate are all parallel to the linear polarizer;
   a first included angle between the absorption axis direction of the linear polarizer and a first direction is 90° to 100° , and is obtained by rotating from the first direction to the absorption axis direction of the linear polarizer counterclockwise in a plane parallel to the linear polarizer; wherein the first direction a horizontal direction;
   a second included angle between the slow axis direction of the half-wave plate and the first direction is 107° to 114° , and is obtained by rotating from the first direction to the slow axis direction of the half-wave plate counterclockwise in a plane parallel to the linear polarizer; and
   a third included angle between the slow axis direction of the quarter-wave plate and the first direction is 164° to 176° , and is obtained by rotating from the first direction to the slow axis direction of the quarter-wave plate counterclockwise in a plane parallel to the linear polarizer;
   wherein the liquid crystal cell is on a side of the quarter-wave plate away from the half-wave plate;
   wherein the liquid crystal cell comprises: a liquid crystal layer containing nematic liquid crystal molecules, wherein an included angle between an initial orientation of the nematic liquid crystal molecules and the slow axis direction of the quarter-wave plate is 0° to 3°.

2. The liquid crystal display panel according to claim 1, wherein a retardation of the liquid crystal layer under a wavelength of 550 nm is 143 nm to 190 nm.

3. The liquid crystal display panel according to claim 2, wherein the retardation of the liquid crystal layer under the wavelength of 550 nm is 170 nm.

4. The liquid crystal display panel according to claim 1, wherein the liquid crystal cell comprises:
   an array substrate, and
   a liquid crystal layer, wherein
   the array substrate is located on a side of the liquid crystal layer away from the optical assembly; and
   the array substrate comprises a base substrate and a plurality of reflective pixel electrodes on the base substrate, the plurality of reflective pixel electrodes being located between the base substrate and the liquid crystal layer.

5. The liquid crystal display panel according to claim 4, wherein the array substrate further comprises:
   a resin layer of a concave-convex structure located between the base substrate and the plurality of reflective pixel electrode, wherein
   the plurality of reflective pixel electrodes structurally conform to the resin layer of the concave-convex structure.

6. The liquid crystal display panel according to claim 5, wherein a slope of the concave-convex structure is 5° to 15°.

7. The liquid crystal display panel according to claim 5, wherein the liquid crystal display panel is a reflective electronically-controlled birefringence liquid crystal display panel.

8. A display apparatus, comprising the liquid crystal display panel of claim 1.

9. The liquid crystal display panel according to claim 1, wherein the first included angle between the absorption axis direction of the linear polarizer and the first direction is 95°;
   the second included angle between the slow axis direction of the half-wave plate and the first direction is 110°; and
   the third included angle between the slow axis direction of the quarter-wave plate and the first direction is 170°.

10. The liquid crystal display panel according to claim 1, wherein a retardation of the half-wave plate under a wavelength of 550 nm is 259 nm to 284 nm; and/or a retardation of the quarter-wave plate under a wavelength of 550 nm is 100 nm to 110 nm.

11. The liquid crystal display panel according to claim 10, wherein the retardation of the half-wave plate under the wavelength of 550 nm is 267 nm; and/or the retardation of the quarter-wave plate under the wavelength of 550 nm is 110 nm.

\* \* \* \* \*